Aug. 5, 1958

W. J. MORRILL 2,846,534

SWITCHING MECHANISM

Filed July 10, 1956

INVENTOR.
WAYNE J. MORRILL
BY Woodling + Krost
attys.

Aug. 5, 1958  W. J. MORRILL  2,846,534
SWITCHING MECHANISM
Filed July 10, 1956  3 Sheets-Sheet 3

INVENTOR.
WAYNE J. MORRILL
BY Woodling + Krost
attys.

United States Patent Office 2,846,534
Patented Aug. 5, 1958

2,846,534

SWITCHING MECHANISM

Wayne J. Morrill, Garrett, Ind.

Application July 10, 1956, Serial No. 596,939

8 Claims. (Cl. 200—61.39)

The invention relates in general to switching mechanisms and more particularly to switching mechanisms for actuating a switch between first and second conditions depending upon the direction of rotation of a prime mover.

Rolling stock such as railway cars and trucks which are adapted to transport perishable goods, frequently utilize fans to circulate the air through the compartments in which the perishable goods are stored. In the past, fans were driven by means of a mechanical coupling between the vehicle wheel and the fan itself. However, since the vehicles were adapted to move in both forward and reverse directions, this resulted in a driving of the fan in either of two rotational directions depending upon the direction of movement of the vehicle. It is desirable, however, that the fans move the air in only one direction regardless of the direction of movement of the vehicle. Electrical systems have also been utilized wherein a generator is driven by suitable linkage means from the axles of the vehicle, with the generator supplying power to an electric motor which in turn drives the fan which is utilized to circulate air through the storage compartment of the vehicle. In the past, mechanical switching arrangements have been utilized to reverse the power to the motor when the direction of movement of the vehicle has been reversed so that the fans always circulate air in the same direction. The mechanical actuators which have been used heretofore would always continually strike the arm of the switch upon each rotation of the vehicle wheel. As a result, these mechanical actuators were subject to continual wear and tear and their life was quite short and they were always subject to malfunctioning.

When the vehicles such as the railway cars or trucks which are transporting the perishable goods have come to a stop in a truck terminal or railway yard, it is still desirable that the fans continue to circulate air. To accomplish this, when the vehicles are to be stationary over prolonged periods of time, the linkage which drives the generator from the vehicle axle is disconnected and the generator is driven by a suitable portable electric or gasoline motor. These gasoline and electric motors in many instances are capable of rapid acceleration at the moment that they start to drive the generator and as a result mechanical actuators of the type which have been provided in the past, if they happen to be in the wrong position for actuating the switch for this particular direction of rotation of the prime mover, then this acceleration will prevent the actuator from performing its switching function and as a result the direction of current flow from the generator to the motor will be reverse to that which is desired.

It is therefore an object of the invention to provide a switching mechanism for actuating a switch between first and second positions upon reversal of rotation of a driving shaft, which is reliable and positive in its action and which cannot be fooled or rendered incapable of performing its switching operation by reversal of the driving shaft and rapid acceleration thereof in an opposite direction.

Another object of the invention is to provide a switching mechanism driven by a prime mover whereby a switch is moved to a first position upon movement of the prime mover in a first direction and which is moved to a second position upon movement of the prime mover in a second direction.

Another object of the invention is to provide a switching mechanism having an actuator pivotally connected to a rotatable carrier and including oppositely facing L-shaped, generally parallel wall members each having lugs extending laterally therefrom toward the other wall member, which lugs are connected by an inertia member which extends a constant radial distance circumferentially about the pivotal connection point of the actuator.

Another object of the invention is to provide a switching mechanism driven by a prime mover and having an actuator for throwing a switch, which actuator will not, upon slow movement or sudden stopping of the prime mover, be caused to engage or bang into the switch thereby causing damage to the switch and to the actuator.

Another object of the invention is to provide a switching mechanism having an actuator for throwing a switch which actuator will not continually tick against the switch upon each rotation of a prime mover.

Another object of the invention is to provide a switching mechanism which includes a carrier having an axis and upon which is pivotally mounted an actuator and upon which is fixedly mounted a stop post, with the stop post and the pivotal mounting of the actuator being on a single radius of the carrier.

Another object of the invention is to provide a switching mechanism which includes an actuator and a stop post engageable therewith which actuator and stop post are capable of approximately 270 degrees movement relative to each other.

Another object of the invention is to provide a switching mechanism which includes an actuator pivotally connected to a rotatable carrier which actuator remains generally within the boundaries of the circular carrier at all times.

Another object of the invention is to provide a switching mechanism including an actuator pivotally connected to a rotatable carrier which actuator has a tendency to maintain a constant rotational position relative to the ground, and a stop post carried by the carrier and adapted to engage the actuator to carry it through a switching movement and move it rotatively relative to the ground with the angular movement of the carrier from the time the stop post engages the actuator until the actuator engages a switch being approximately 45 degrees.

Another object of the invention is to provide a switching mechanism including a pivotally attached actuator having first and second switch finger actuators which are spaced substantially 90 degrees apart relative to the point of pivotal attachment of the actuator.

Another object of the invention is to provide an actuator having a circular inertia ring thereabout which increases the moment of inertia of the actuator without adding to its unbalanced weight.

Other objects and a fuller understanding of this invention may be had by referring to the following description and claims, taken in conjunction with the accompanying drawings, in which:

Figure 7 is a view similar to that shown in Figure 4 but showing different paths of travel of the switching lugs;

Figure 1:
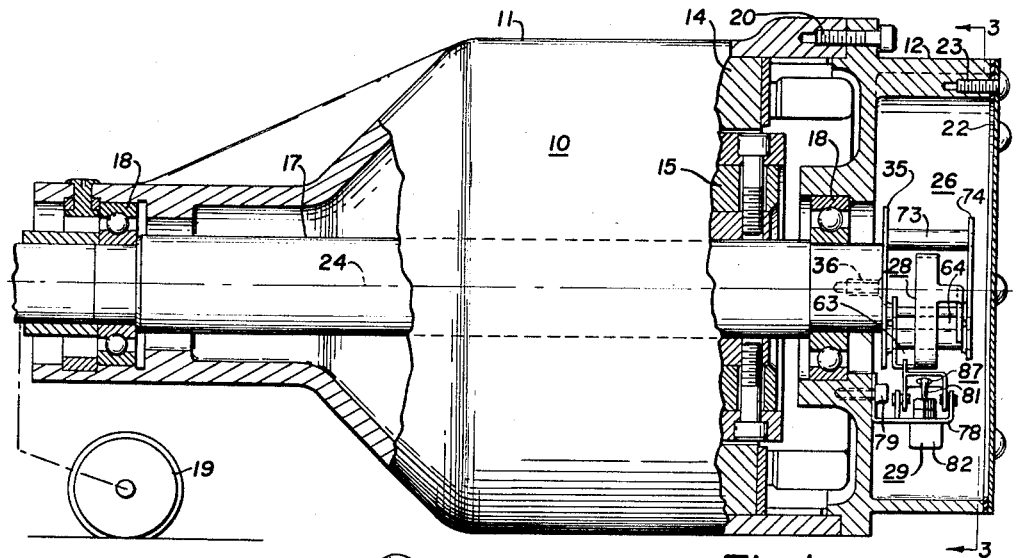
Figure 1 is a side elevational view partially in section showing a generator with which the switching mechanism of the present invention is adapted to cooperate.
Figure 2:
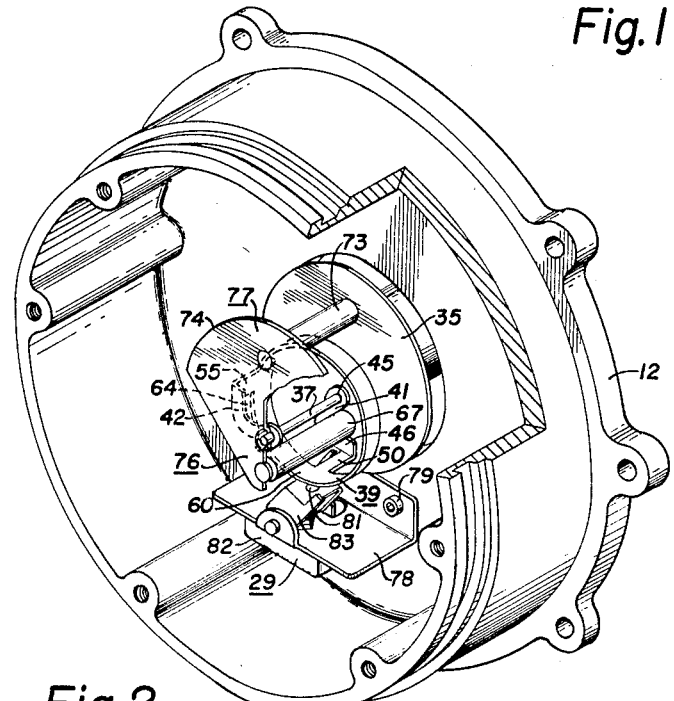
Figure 2 is an isometric view partially in section showing the switching mechanism of the present invention and taken from the right end of Figure 1 with the cover plate of the end bell removed.

Figure 1 shows generally a generator 10 which includes a main housing 11 having an end bell 12. The generator 10 has a stator 14 and a rotor 15. The rotor 15 is secured to and is driven by a shaft 17 which is journalled upon bearings 18 and in Figure 1 is shown schematically as being driven by the rotation of a railway car wheel 19. The end bell 12 is suitably connected to the main housing 11 by means of screws 20. The end bell is provided with a cover 22 suitably secured thereto by bolts 23, which prevents foreign material from entering therein. The entire assembly is constructed generally about a horizontal axis 24.

Figure 9:
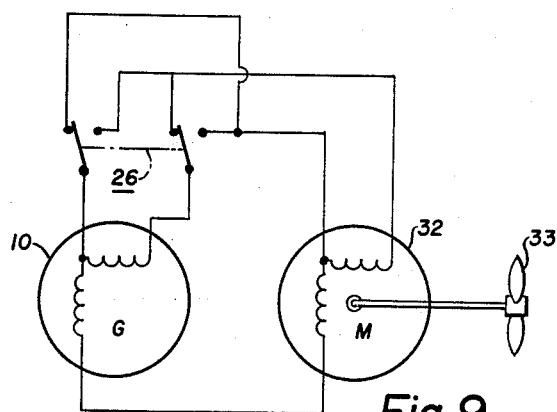
Figure 9 is an electrical circuit diagram of the switching mechanism applied to a two-phase generator and motor circuit.

The switching mechanism of the present invention is indicated generally by the reference numeral 26 and includes in combination a reversing mechanism 28 and a switch assembly 29. Figure 9 shows schematically the circuit diagram wherein the generator 10 supplies power through the switching mechanism 26 to a motor 32. In this present illustration of Figure 9 of the generator 10 has been illustrated as a two-phase generator and has two different electrical conditions which in this case would be the two different phase rotations of the electrical output. The motor 32 is adapted to receive the electrical output of the generator 10 and has for the purposes of illustration in this Figure 9 been shown as a two-phase motor. This two-phase motor drives a fan 33.

Figure 6:
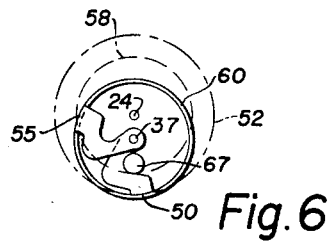
Figure 6 is a view similar to that shown in Figure 3 but showing the paths of travel of the switching lugs.

Figures 2 through 8 show the details of construction of the switching mechanism 26 of the present invention which includes the hereinabove referred to reversing mechanism 28 and switch assembly 29. The reversing mechanism 28 comprises a rotatable carrier 35 coaxial with the generator 10 and the drive shaft 17. The carrier 35 is fixedly secured to the drive shaft 17 by means of a screw 36 and as a result rotates in accordance with the rotation of the drive shaft. The carrier 35 may be said to have a generally horizontal axis of rotation. A pivot member 37 is carried by the rotatable carrier 35 a spaced distance from the axis 24. An actuator 39 is provided which includes first and second L-shaped wall members 41 and 42, respectively. These L-shaped wall members are substantially parallel and are axially spaced from each other. These L-shaped wall members 41 and 42 each face generally in opposite directions, and each has head and toe portions 45 and 46, respectively. The head portion 45 of each of the L-shaped wall members is provided with pivot bearing means. Each of the pivot bearing means cooperate with the pivot member 37 to connect the actuator for pivotal movement about the pivot member 37. A first lug 50 extends laterally from the toe portion 46 of the first L-shaped wall member 41 toward the second L-shaped wall member 42 to a point about midway between the two L-shaped wall members. This first lug 50 is adapted to move in first and second radially spaced paths 52 and 53, respectively, about the axis 24 of the carrier 35. A second lug 55 extends laterally from the toe portion 46 of the second L-shaped wall member 42 toward the first L-shaped wall member and terminates at a point about midway between the two wall members. The second lug 55 is adapted to move in first and second radially spaced paths 57 and 58, respectively, about the axis 24 of the rotatable carrier 35. The lugs 50 and 55 are axially spaced from each other. The radially spaced paths of the first and second lugs are best seen in Figures 6 and 7.

A circular inertia member 60 extends completely around the pivot member 37 and is substantially equidistantly spaced at all points from the pivot member 37. The inertia member 60 extends between and is connected to each of the first and second lugs 50 and 55, respectively. These first and second lugs 50 and 55, respectively, are spaced less than 120 degrees apart. A first guideway 63 is formed between the first L-shaped wall member 41 and a side portion of the inertia member 60 which extends between the first and second lugs and a second guideway 64 is formed between the second L-shaped wall member 42 and another portion of the inertia member 60 which extends between the first and second lugs.

Figure 3:
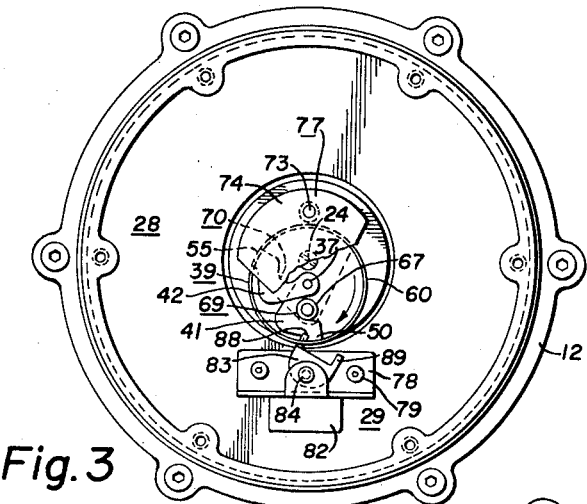
Figures 3, 4 and 5 are views taken generally along the line 3—3 of Figure 1 but with the switching mechanism in different positions.

A stop post 67 is carried by the rotatable carrier 35 by one end portion thereof and is spaced a greater distance from the axis 24 than is the pivot member 37 and the stop post 67 is located on the same side of the axis 24 as the pivot member and is in line with the axis and pivot member. The stop post 67 is adapted to alternatively engage an arcuate surface 69 on the first L-shaped wall member 41 and an arcuate surface 70 on the second L-shaped wall member 42. Figure 3 shows the stop post engaging the arcuate surface 69 on the L-shaped wall member 31 upon rotation of the rotatable carrier in a clockwise direction. The stop post is shown engaging the arcuate surface 70 of the L-shaped wall member 42 upon rotation of the carrier in a counter-clockwise direction in Figure 4. The physical size and shape of the L-shaped wall members 41 and 42, respectively, and relative positioning thereof and positioning of the stop post 67 permits relative movement between the stop post and the actuator 39 of more than 180 degrees. In other words, the actuator 39 may be rotated about the pivot member 37 more than 180 degrees or the rotatable carrier 35 may be rotated about the axis 24 more than 180 degrees without actually causing the actuator 39 to engage with the stop post 67. In this physical embodiment shown in the present drawings the actual movement which the actuator and stop post are capable of moving relative to each other without engaging each other is approximately 270 degrees.

A support post 73 is carried by the rotatable carrier 35 by one end portion thereof. A retaining plate 74 is secured respectively to the stop post 67, the support post 73 and the pivot member 37 at opposite ends thereof from which they are secured to the rotatable carrier. The retaining plate 74 is located substantially parallel to and axially spaced from the carrier 35. The retaining plate 74 is generally fan shaped in configuration with one end portion therof 76 which is secured to the stop post having a good deal less mass and therefore being comparably lighter than an opposite end portion 77 thereof which is secured to the support post 73. The reason for this particular shape on the retaining plate is to generally balance the switching mechanism. It will be noted that the weight of the actuator is practically at all times centered about the stop post 67 and so the heavier end portion 77 of the retaining plate serves to off-set or counter-balance the weight of the actuator 39.

Figure 4:
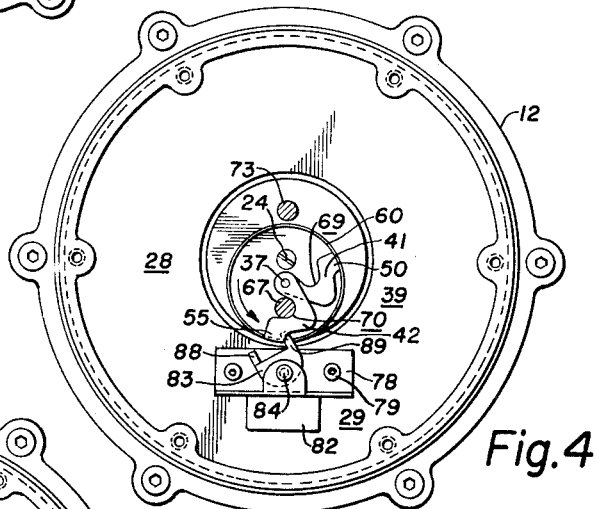

The switch assembly 29 is located vertically below the reversing mechanism 28 and comprises a mounting plate 78 suitably secured by screws 79 to the end bell 12. A pivotally attached switch arm 81 extends into a switch box 82. The switch box 82 houses contacts which movement of the switch arm 81 from first and second positions, makes and breaks. The interior of the switch box and the contacts 82 have not been shown in Figures 1 through 6 but these contacts have been shown schematically in Figures 9 and 10. An inverted U-shaped trigger member 83 is pivotally connected at 84 to the mounting plate 78 and is movable between first and second positions. Wall means 87 on the trigger member 83, surround an upper portion of the switch arm 81 thereby causing the switch arm to move in accordance with the movement of the trigger member 83. First and second axially spaced fingers 88 and 89, respectively, are carried by the trigger member. The first finger lies in a plane contained by the first and second paths 52 and 53, respectively, which are the paths in which the first lug 50 is adapted to move. The second finger 89 lies in a plane contained in the first and second paths 57 and 58, respectively, which are the paths in which the second lug 55 is adapted to move. The first finger 88 lies in the first radially spaced path 52 of the first lug 50 when the trigger member 83 is in the first position. This position is shown in Figure 3 of the accompanying drawings. When in this position shown in Figure 3, it will be noted that the second lug 55 travels in its second radially spaced path 58 since the second lug 55 has been moved arcuately toward the axis 24 by the engagement of the stop post 67 with the actuator 39. The second finger 89 lies in the first radial path 57 of the second lug 55 when the U-shaped trigger member 83 is in the second position. This position is shown in Figure 4 of the drawings.

To describe the operation of the switching mechanism let it be assumed that the U-shaped trigger member 83 is in the first position (Figure 3). Rotation of the shaft 17 in a clockwise direction will therefore cause the stop post 67 to engage the arcuate surface 69 of the L-shaped wall member 41 thereby causing the first lug 50 to travel in its first path 52. This also causes the second lug 55 to travel in its second path 58. These two paths of travel are shown in Figure 6. Continued rotation of the carrier 35 in a clockwise direction through the position shown in Figure 3 causes the U-shaped trigger member 83 to move into its second position or in other words the position which is shown in Figure 4. It will be noted that from a viewing of Figure 3 that the axis 24, the pivot member 37, the stop post 67, the first lug 50, the first finger 88 and the pivotal mounting point 84 all lie in a single plane thereby causing the forces which are exerted on all the component parts of the switching mechanism to be in line and thereby minimizing any unequal stresses which might be exerted on the parts, thus giving long life to the mechanism. Continued rotation of the carrier 35 in a clockwise direction for 360 degrees will cause the component parts of the reversing mechanism to be in the same position as shown in Figure 3. Since the trigger member 83 has already been moved to the second position there will be no engagement with the switch assembly as the parts pass through this position at this time. This will be true regardless of how many rotative cycles the carrier 35 goes through so long as they are in a clockwise direction. The position of the contacts in Figure 9 are at positions which they assume when the trigger member 83 is in the second position (Figure 4). At rapid speeds centrifugal force keeps the actuator 39 and the stop post 67 in the same relative positions shown in Figure 3 regardless of the rotative position of the carrier 35. At slow speeds, however, when the carrier 35 has rotated approximately 140 degrees clockwise from the position shown in Figure 3 the actuator will, because of the force of gravity, swing down into the position generally shown in Figure 5. However, this will make little or no difference because it will be observed that with continued clockwise rotation of the carrier (Figure 5) the stop post 67 will again engage the arcuate surface 69 of the L-shaped wall member 41 and carry the actuator through its switching travel (Figure 3) in the same position as before.

Figure 5:
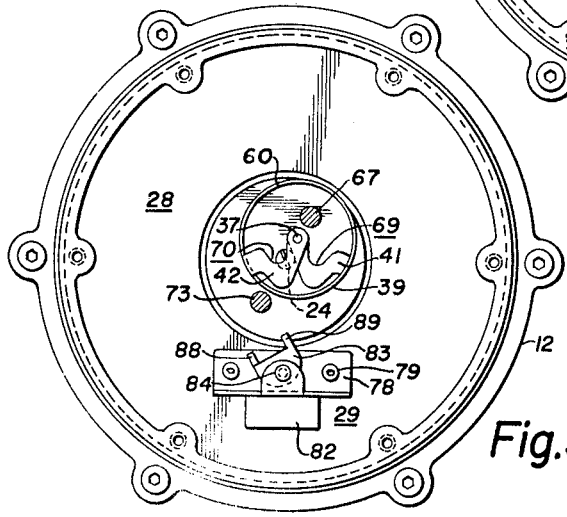
Figure 8:
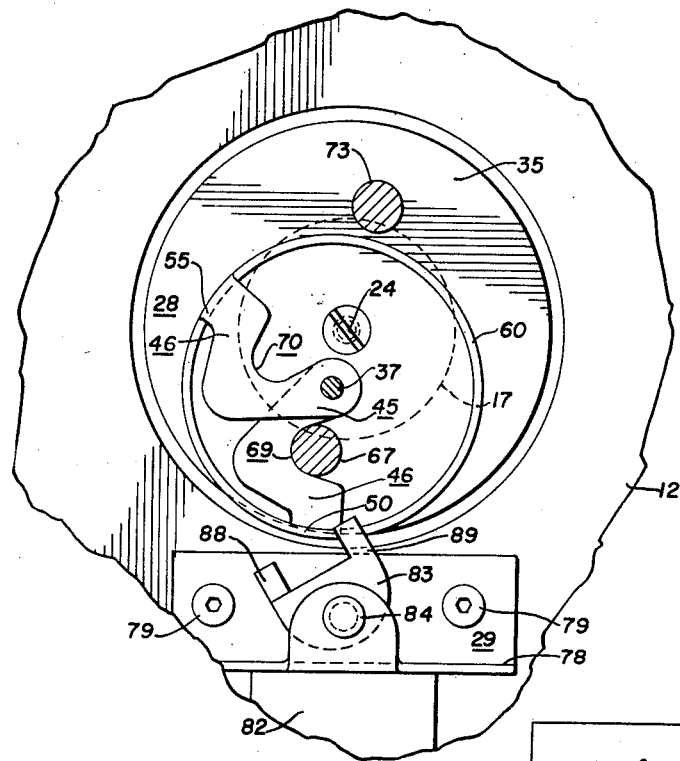
Figure 8 is an enlarged fragmentary view similar to Figures 3, 4, and 5, but showing the switching mechanism in slightly more detail.

Assume now that the carrier 35 and shaft 17 cease their clockwise rotation with the parts of the switching mechanism in the position shown in Figure 5. Rotation of the shaft 17 and carrier 35 in a counter-clockwise direction will then cause the stop post 67 to engage the arcuate surface 70 of the second L-shaped wall member 42. This engagement will cause the second lug 55 to travel in its first path 57 and engage the second finger 89 of the U-shaped trigger member 83 as shown in Figure 4. Continued rotation of the carrier 35 in this counter-clockwise direction will cause the trigger member 83 to move to its first position (Figure 3). Thereafter continued rotation of the carrier 35 in its counter-clockwise direction will cause the parts of the reversing mechanism to be continually carried through the position shown in Figure 4 in the same relative position and as a result the trigger member will still be maintained in its first position. The paths of travel of the first and second lugs comparable to the position of the parts in Figure 4 have been shown in Figure 7. Reversal of the direction of rotation of the shaft 17 and carrier 35 to cause them to travel in a clockwise direction will bring about the movement of the trigger to the second position again as has been described hereinabove in the operation of the switching mechanism when the carrier is rotating in a clockwise direction.

Assume now that the railway car or truck in which the herein described system has been installed has come to a stop in a yard or terminal and is to remain there for an extended period of time. Since it is desirable that the fans continue to operate, the linkage which drives the generator from the vehicle axle is disconnected and a suitable portable electric or gasoline motor is connected to drive the generator. Let it also be assumed that the portable electric or gasoline motor is capable of rapidly accelerating the shaft 17 of the generator. It has been found that without the presence of the inertia member and in the case of rapid acceleration of the shaft 17 and consequently of the carrier 35, that this rapid acceleration of the carrier would cause the actuator to be held against the stop post 67 in the wrong direction and hence the reversing mechanism would fail to throw the U-shaped trigger member 83 and hence the switch arm 81 into the correct position. To illustrate this point, assume in Figure 8 that the carrier 35 has just stopped rotating in a clockwise direction with the parts of the switching mechanism remaining in the position in whch they are shown. Then assume that the electrc motor which is capable of rapid acceleration rotates the shaft 17 and the carrier 35 in the opposite or counter-clockwise direction. Because of the high acceleration the arcuate surface 69 of the actuator 39 would remain in engagement with the stop post 67 and would travel around in this position thereby holding the second lug 55 in its second path 58 and since this second lug must be in its first path 57 in order to engage the second finger 89, the trigger member would not be thrown to its first position in which it belongs. To circumvent the possibility of failure of the switching mechansm upon reversal of the direction of rotation of the device and rapid acceleration thereof, the inertia member 60 has been added to the actuator 39. As will be noted the inertia member is circular in configuration and extends substantially equidistantly at all points thereof from the pivot member 37. It will be noted that this inertia member 60 increases the moment of inertia of the device without adding to its unbalanced weight. In other words by increasing the moment of inertia of the actuator by this method, the actuator tends to hang straight down upon sudden reversal of rotation of the carrier and does not travel with the stop post 67 but allows the stop post to approach the actuator from the opposite side and engage the arcuate surface 70 of the L-shaped wall member 42 and as a result causes the second lug 55 to travel in its first path 57 and engage the second finger 89 and move the trigger member 83 to the first position in which it is shown in Figure 3.

Figure 10:
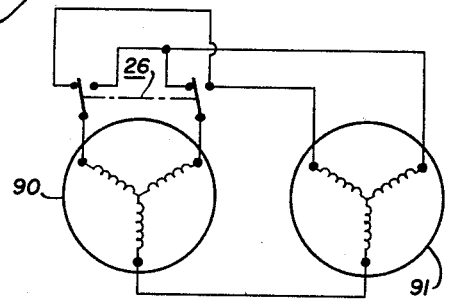
Figure 10 is an electrical circuit diagram of the switching mechanism applied to a three-phase generator and motor circuit.

Figure 10 shows the switching mechanism 26 used in connection with a three-phase generator 90 and motor 91 and will in such case still provide the reversal of the electrical condition of the generator output to reverse the phase rotation of the generator voltages.

It will thus be noted that a switching mechanism has been provided which will actuate a switch between first and second positions upon reversal of rotation of a drive shaft or prime mover which is reliable and positive in its action and which cannot be fooled or rendered incapable of performing its switching operation by reversal of the driving shaft and rapid acceleration thereof in an opposite directon. One of the primary reasons for the success of this fool-proof reversing mechanism is because of the addition of the inertia member to the actuator. It will also be noted that because of the relative positioning of the parts of the mechanism that the actuator will not continually strike the U-shaped trigger member after the switch has once been thrown and as a result will not cause continual wearing upon continued rotation of the drive shaft. The unique method of adding to the inertia of the actuator without adding to its unbalanced weight and the provision of the retaining plate to counter-balance the weight of the actuator also has contributed to the successfulness of this new and unique switching mechanism.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A switching mechanism including a housing having a substantially horizontal axis, a carrier coaxial with said housing and located generally normal to said axis, a shaft communicating with said housing and coaxial therewith, means connected said shaft to said carrier, a pivot member carried by said carrier by one end portion thereof a spaced distance from said axis, an actuator including first and second L-shaped wall members, said first and second L-shaped wall members being substantially parallel to and axially spaced from each other, said first and second L-shaped wall members each facing in opposite directions, each said L-shaped wall members having head and toe portions, said head portion of each of said L-shaped wall members having pivot bearing means, each said pivot bearing means cooperating with said pivot member to connect said actuator for pivotal movement about said pivot member, a first lug extending laterally from said toe portion of said first L-shaped wall member toward said second L-shaped wall member and adapted to move in first and second radially spaced paths about said pivot member, a second lug extending laterally from said toe portion of said second L-shaped wall member toward said first L-shaped wall member and adapted to move in first and second radially spaced paths about said pivot member, said first and second lugs being axially spaced from each other, a circular inertia member extending completely around said pivot member and substantially equidistantly spaced at all points from said pivot member, said inertia member extending between and connected to each of said first and second lugs, said first and second lugs being spaced less than 120 degrees apart, a first guideway formed between said first L-shaped wall member and a portion of said inertia member and a second guideway formed between said second L-shaped wall member and a portion of said inertia member, a stop post carried by said carrier by one end portion thereof and spaced a greater distance from said axis than said pivot member and located on the same side of said axis as said pivot member and in line with said axis and said pivot member, said L-shaped wall members and the relative positioning thereof and the positioning of said stop post permitting relative movement between said stop post and said actuator of more than 180 degrees, a support post carried by said carrier by one end portion thereof, a retaining plate substantially parallel to said carrier and secured to another end portion of said stop post, support post and pivot member, rotation of said carrier in a first direction causing said stop post to engage said first L-shaped wall member whereby said first lug travels in its first radial path and said second lug travels in its said second radial path, rotation of said carrier in a second direction causing said stop post to engage said second L-shaped wall member whereby said second lug travels in its first radial path and said first lug travels in its second radial path, a mounting plate located vertically below said axis, a pivotally attached switch arm, an inverted U-shaped trigger member pivotally connected to said mounting plate and movable between first and second positions, wall means on said trigger member engaging a portion of said switch arm thereby causing said switch arm to move with said trigger member, first and second axially spaced fingers carried by said trigger member, said first finger lying in said first radial path of said first lug when said trigger member is in said first position and said second finger lying in said first radial path of said second lug when said trigger member is in said second position.

2. A mechanism for moving a switch to first and second positions depending on the direction of rotation of a driving shaft including in combination a reversing mechanism and a switch assembly, said reversing mechanism comprising a rotatable carrier having a horizontal axis of rotation, a pivot member carried by said rotatable carrier a spaced distance from said axis, an actuator including first and second L-shaped wall members, said first and second L-shaped wall members being substantially parallel to and axially spaced from each other, said first and second L-shaped wall members each facing in opposite directions, each said L-shaped wall members having head and toe portions, said head portion of each of said L-shaped wall members having pivot bearing means, each said pivot bearing means cooperating with said pivot member to connect said actuator for pivotal movement about said pivot member, a first lug extending laterally from said toe portion of said first L-shaped wall member toward said second L-shaped wall member and adapted to move in first and second radially spaced paths about said axis of said rotatable carrier, a second lug extending laterally from said toe portion of said second L-shaped wall member toward said first L-shaped wall member and adapted to move in first and second radially spaced paths about said axis of said rotatable carrier, said first and second lugs being axially spaced from each other, a circular inertia member extending completely around said pivot member and substantially equidistantly spaced at all points from said pivot member, said inertia member extending between and connected to each of said first and second lugs, said first and second lugs being spaced less than 120 degrees apart, a first guideway formed between said first L-shaped wall member and a portion of said inertia member and a second guideway formed between said second L-shaped wall member and a portion of said inertia member, a stop post carried by said rotatable carrier and spaced a greater distance from said axis than said pivot member and located on the same side of said axis as said pivot member and in line with said axis and said pivot member, rotation of said carrier in a first direction causing said stop post to engage said first L-shaped wall member whereby said first lug travels in its first radial path and said second lug travels in its second radial path, rotation of said carrier in a second direction causing said stop post to engage said second L-shaped wall member whereby said second lug travels in its first radial path and said first lug travels in its second radial path, said switch assembly located vertically below said reversing mechanism and comprising a mounting plate, a pivotally attached switch arm, an inverted U-shaped trigger member pivotally connected to said mounting plate and movable between first and second positions, wall means on said trigger member surrounding a portion of said switch arm thereby causing said switch arm to move with said trigger member, first and second axially spaced fingers carried by said trigger member, said first finger lying in said first radial path and out of said second radial path of said first lug when said trigger member is in said first position and said second finger lying in said first radial path and out of said second radial path of said second lug when said trigger member is in said second position.

3. A reversing mechanism comprising a rotatable carrier having an axis of rotation, a pivot member carried by said rotatable carrier a spaced distance from said axis, an actuator including first and second L-shaped wall members, said first and second L-shaped wall members being substantially parallel to and axially spaced from each other, said first and second L-shaped wall members each facing in opposite directions, each said L-shaped wall members having head and toe portions, said head portion of each of said L-shaped wall members having pivot bearing means, each said pivot bearing means cooperating with said pivot member to connect said actuator for pivotal movement about said pivot member, a first lug extending laterally from said toe portion of said first L-shaped wall member toward said second L-shaped wall member and adapted to move in first and second radially spaced paths about said pivot member, a second lug extending laterally from said toe portion of said second L-shaped wall member toward said first L-shaped wall member and adapted to move in first and second radially spaced paths about said pivot member, said first and second lugs being axially spaced from each other, a circular inertia member extending completely around said pivot member and substantially equidistantly spaced at all points from said pivot member, said inertia member extending between and connected to each of said first and second lugs, a stop post carried by said rotatable carrier and spaced a greater distance from said axis than said pivot member and located on the same side of said axis as said pivot member, rotation of said carrier in a first direction causing said stop post to engage said first L-shaped wall member whereby said first lug travels in its first radial path and said second lug travels in its second radial path, rotation of said carrier in a second direction causing said stop post to engage said second L-shaped wall member whereby said second lug travels in its first radial path and said first lug travels in its second radial path.

4. A mechanism for moving a switch to first and second positions depending on the direction of rotation of a driving shaft including in combination a reversing mechanism and a switch assembly, said reversing mechanism comprising a rotatable carrier having an axis of rotation, a pivot member carried by said rotatable carrier a spaced distance from said axis, an actuator including first and second wall members, said first and second wall members being axially spaced from each other, each said wall members having first and second spaced portions, said first portion of each of said wall members having pivot bearing means, each said pivot bearing means cooperating with said pivot member to connect said actuator for pivotal movement about said pivot member, a first lug extending laterally from said second portion of said first wall member toward said second wall member and adapted to move in first and second radially spaced paths about said pivot member, a second lug extending laterally from said second portion of said second wall member toward said first wall member and adapted to move in first and second radially spaced paths about said pivot member, said first and second lugs being axially spaced from each other, a circular inertia member on said actuator and extending completely around said pivot member and substantially equidistantly spaced at all points from said pivot member, a stop post carried by said rotatable carrier and spaced a greater distance from said axis than said pivot member, said switch assembly located below said reversing mechanism and comprising a pivotally attached trigger member movable between first and second positions, first and second axially spaced fingers carried by said trigger member, said first finger lying in said first radial path of said first lug when said trigger member is in said first position and said second finger lying in said first radial path of said second lug when said trigger member is in said second position.

5. A switching mechanism including a rotatable carrier having an axis of rotation, an actuator, pivot means pivotally attaching said actuator to said carrier at a spaced distance from said axis, said actuator comprising first and second lugs spaced from each other and from said pivot means a first distance, a circular inertia member extending between said first and second lugs and completely around said pivot means with all points on said inertia member substantially equidistantly spaced from said pivot means, a stop post carried by said carrier, rotation of said carrier in one direction causing said stop post to engage said actuator on a first side portion thereby moving said first lug in a first path to engage and move a first switch finger and rotation of said carrier in another direction causing said stop post to engage said actuator on a second side portion thereby moving said second lug in a second path to engage and move a second switch finger.

6. A switching mechanism including a rotatable carrier having an axis of rotation, an actuator, pivot means pivotally attaching said actuator to said carrier at a spaced distance from said axis, said actuator comprising first and second lugs spaced from each other and from said pivot means, a circular inertia member extending around said pivot means, and a stop post carried by said carrier in a position to alternatively engage first and second portions of said actuator.

7. A switching mechanism including a rotatable carrier, an actuator, means pivotally attaching said actuator to said carrier, said actuator comprising first and second lugs spaced from each other and from said means, an annular inertia member connected to said first and second lugs and extending around said means, a stop member carried by said carrier, rotation of said carrier in a first direction causing said stop member to engage said actuator at a first portion thereby moving said first lug in a first path to engage and move a first switch finger, and rotation of said carrier in a second direction causing said stop member to engage said actuator at a second portion thereby moving said second lug in a second path to engage and move a second switch finger.

8. A switching mechanism including a rotatable carrier, an actuator, means attaching said actuator to said carrier for arcuate movement with respect thereto, said actuator comprising first and second lugs spaced from each other, an annular inertia member connected to said lugs and extending around said arcuate attachment means, a stop member carried by said rotatable carrier, rotation of said carrier in a first direction causing said lugs to travel in first paths, and rotation of said carrier in a second direction causing said lugs to travel in second paths.

References Cited in the file of this patent

UNITED STATES PATENTS

| | | |
|---|---|---|
| 2,483,122 | Bower | Sept. 27, 1949 |
| 2,734,957 | Beemer | Feb. 14, 1956 |